United States Patent [19]

Murasaki et al.

[11] 4,174,904
[45] Nov. 20, 1979

[54] ELECTROPHOTOGRAPHIC COPYING APPARATUS FOR COPYING THICK AND THIN ORIGINALS

[75] Inventors: Hiroshi Murasaki, Sakai; Yuji Enoguchi, Osaka; Kenichi Wada; Takao Fujiwara, both of Sakai, all of Japan

[73] Assignee: Minolta Camera Kabushiki Kaisha, Osaka, Japan

[21] Appl. No.: 844,068

[22] Filed: Oct. 20, 1977

[30] Foreign Application Priority Data

Oct. 26, 1976 [JP] Japan .................................. 51-129242

[51] Int. Cl.$^2$ ............................................. G03G 15/28
[52] U.S. Cl. .......................................... 355/8; 355/11; 355/51; 355/66
[58] Field of Search ...................... 355/8, 3 R, 11, 14, 355/50, 51, 66, 81, 84

[56] References Cited

U.S. PATENT DOCUMENTS

| | | | |
|---|---|---|---|
| 3,740,133 | 6/1973 | Komori et al. | 355/81 X |
| 3,790,272 | 2/1974 | Knechtel et al. | 355/8 X |
| 3,900,258 | 8/1975 | Hoppner et al. | 355/8 X |

*Primary Examiner*—R. L. Moses
*Attorney, Agent, or Firm*—Wenderoth, Lind & Ponack

[57] ABSTRACT

An electrophotographic copying apparatus which includes a thin sheet original transporting device having transporting rollers and disposed adjacent to a transparent platform for holding thick originals at the upper portion of the copying apparatus, and an image forming optical system moving device for moving the optical system from a scanning starting position for thick original copying to a stationary optical system position for thin sheet original copying in association with a change-over of operation from copying a thick original to copying a thin sheet original in order to eliminate disadvantages inherent in exposures in conventional copying apparatuses, and the distance between first and second reflecting mirrors of the optical system at the scanning starting position for copying thick originals is set to be less than that when the optical system is in the stationary position for reduction of the size of the copying apparatus.

3 Claims, 9 Drawing Figures

ELECTROPHOTOGRAPHIC COPYING APPARATUS FOR COPYING THICK AND THIN ORIGINALS

BACKGROUND OF THE INVENTION

The present invention relates to an electrophotographic copying apparatus and more particularly, to an electrophotographic copying apparatus having a transparent platform, for example, of glass material disposed at an upper portion of the copying apparatus for supporting a thick original such as a book to be copied on said transparent platform, and a transporting means for a thin original such as a sheet of paper (referred to as sheet original hereinbelow) provided with transportation rollers and disposed adjacent to the transparent platform so that during copying of a thick original, the image forming optical system scans the original from beneath the transparent platform for sequentially exposing a photosensitive member or photoreceptor to image-carrying light from the original, while for copying a thin sheet original, the thin sheet original is transported by the sheet original transporting means, with the image forming optical system remains stationary, for sequentially directing the image-carrying light from the sheet original onto the photoreceptor for exposure.

Conventionally, in the electrophotographic copying apparatus of the above described type, there has been proposed, for example, in U.S. Pat. No. 3,947,111 issued Mar. 30, 1976, an arrangement in which a thick original is placed on a transparent platform of glass material for copying of such a thick original, and an image forming optical system is moved under the transparent platform for sequential scanning so as to expose a photosensitive member to light images of the thick original, while for the copying of a thin original in sheet form, a sheet original transporting means having transportation rollers is adapted to move onto the transparent platform, with the image forming optical system being kept stationary after having been moved to a predetermined position below the sheet original transporting means, the sheet original transporting means transporting the sheet original for sequentially exposing the photosensitive member to the light images from said sheet original.

The known copying apparatus as described above, however, has various disadvantages in that, for copying the sheet originals, the sheet original transporting means must be moved onto the transparent platform after a pressing cover for the original which is hingedly mounted on the platform has been raised upward to an opened position, thus requiring a troublesome procedure, and moreover, since the transportation rollers engage only on the upper surface of the sheet original to be transported, there is a tendency for a sheet original of comparatively small stiffness not to be positively transported but rather to be subject to wrinkling or jamming during the course of transportation.

Figure 1:
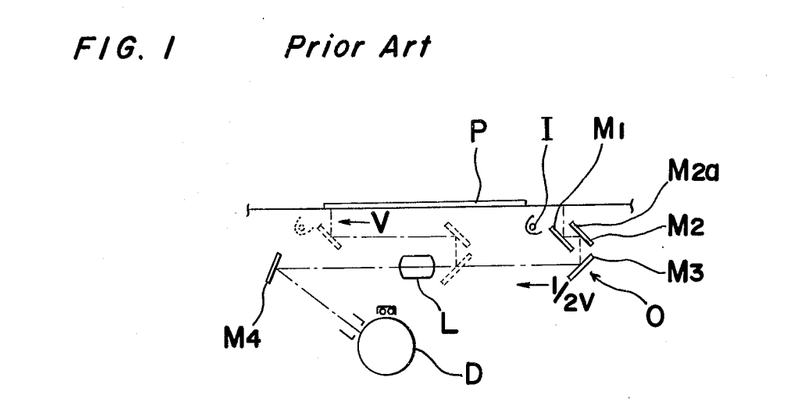
FIG. 1 is a schematic diagram showing an arrangement of an optical system for a conventional electrophotographic copying apparatus which has already been referred to, FIG. 2 is a perspective view showing an electrophotographic copying apparatus according to one preferred embodiment of the present invention.

In order to overcome the disadvantages as described above, there has been proposed, for example, in Japanese Patent publication Tokkaisho 101538/76, another electrophotographic copying apparatus provided with a mechanism for copying thick originals and another mechanism exclusively for copying sheet originals. In this prior art copying apparatus, when thick originals are to be copied, the original is placed on an original platform and scanned by first and second carriages moving at a speed ratio of 1:½, while for copying sheet originals, the sheet original is transported along a transporting path for the sheet original at the upper part of a scanning starting position of said first carriage with the carriages being held stationary so that light images of the sheet original being transported during scanning are projected onto the photosensitive member through the stationary first and second carriages. More specifically, the construction of such a known copying apparatus is shown in FIG. 1, in which, below a transparent platform P for supporting a thick original (not shown), there is disposed an optical system O which includes an illuminating lamp I and a first reflecting mirror M1 moved horizontally for scanning in a direction parallel to the platform P at a speed V equal to the circumferential speed of a photoreceptor drum D, a second and third reflecting mirrors M2 and M3 also moved horizontally at half the circumferential speed of the photoreceptor drum D, and a fourth reflecting mirror M4 and an image forming lens assembly L which are stationary. The starting positions of the first, second and third mirrors M1, M2 and M3 at the start of scanning are positions shifted to a predetermined slight extent from one end of the platform P in a direction opposite to the scanning direction, taking into account the time for the illuminating lamp I to reach peak intensity of light emission and vibrations of the mirrors M1 to M3 at the time of starting. For copying of sheet originals, a sheet original is transported by juxtaposed transportation rollers (not shown) disposed above the first reflecting mirror M1 while the mirrors M1–M3 are held stationary in the full line positions in the drawing for sequentially directing the light images of the original onto the surface of the photoreceptor drum D for exposure.

The known copying apparatus as described above still has disadvantages in that due to the close proximity of the first and second reflecting mirrors M1 and M2 at the start of the scanning by the optical system O, the part M2a of the second mirror M2 undesirably encroaches upon the light path between the sheet original and the first mirror M1, thus resulting in an obstacle to the exposure. Moreover, in a copying apparatus of the above described type wherein reflecting mirrors such as the mirrors M1, M2 and M3 are reciprocated for the scanning, it is the general practice to provide looseness or side play for reducing friction between sliding members (not shown) holding the mirrors M1, M2 and M3 and guide shafts (not shown) to guide such sliding members for increasing the return speed during reciprocation with improved smoothness. When the optical system O is located at the scanning starting position, however, there is the inconvenience, for example, that the sliding member contacts a damper for restricting the movement of the first mirror at the scanning starting position, with consequent inclination of the first mirror M1 due to the presence of the side play as described above, and if the surface of the photoreceptor drum D is exposed to the light images during transportation of the sheet original, while the optical system O is held stationary at the scanning starting position, a true image is not formed on the surface of the photoreceptor drum D due to the inclination of the first mirror M1, resulting in distortion of the copied image.

Accordingly, an essential object of the present invention is to provide an electrophotographic copying apparatus which is free from the foregoing disadvantages especially during copying of sheet originals so as to provide clear and accurate copied images having no distortion.

Another important object of the present invention is to provide an electrophotographic copying apparatus of the above described type which is capable of positively transporting sheet originals without wrinkling or jamming with substantial elimination of disadvantages inherent in the conventional copying apparatus of this kind.

A further object of the present invention is to provide an electrophotographic copying apparatus of the above described type which has a simple construction and is compact in size, and can be readily put into production at low cost.

In order to accomplish these and other objects, according to one preferred embodiment of the present invention, the electrophotographic copying apparatus includes means for transporting sheet originals having transporting rollers and disposed adjacent to a transparent platform for thick original at the upper portion of the copying apparatus, and means for moving an image forming optical system, at the time of change-over from copying thick originals to copying sheet originals, from a scanning starting position for thick original copying to a stationary position of the optical system for sheet original copying in order to eliminate the inconveniences inherent in exposures in the conventional copying apparatuses during copying of sheet originals, while the distance between the first reflecting mirror and second reflecting mirror at the scanning starting position is reduced for making the size of the copying apparatus itself compact. Moreover, the transportation rollers for the originals are provided above and below the path of the sheet originals for positive transportation of such sheet originals without wrinkling and jamming.

BRIEF DESCRIPTION OF THE DRAWINGS

These and other objects and features of the present invention will become apparent from the following description taken in conjunction with the accompanying drawings in which.

Before the description of the present invention proceeds, it is to be noted that like parts are designated by like reference numerals throughout the several views of the accompanying drawings.

DETAILED DESCRIPTION OF THE INVENTION

Figure 2:
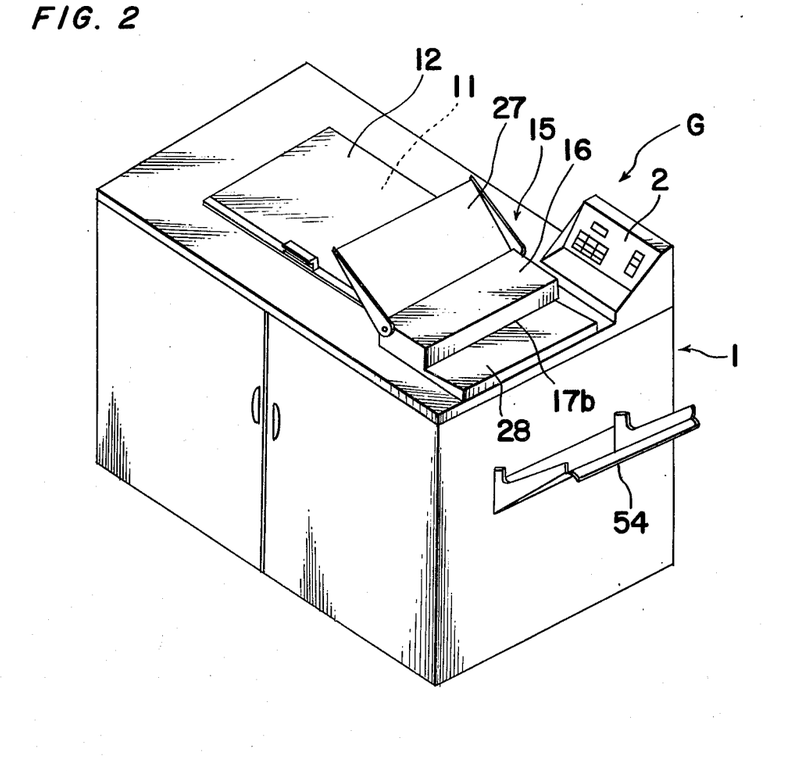
Figure 3:
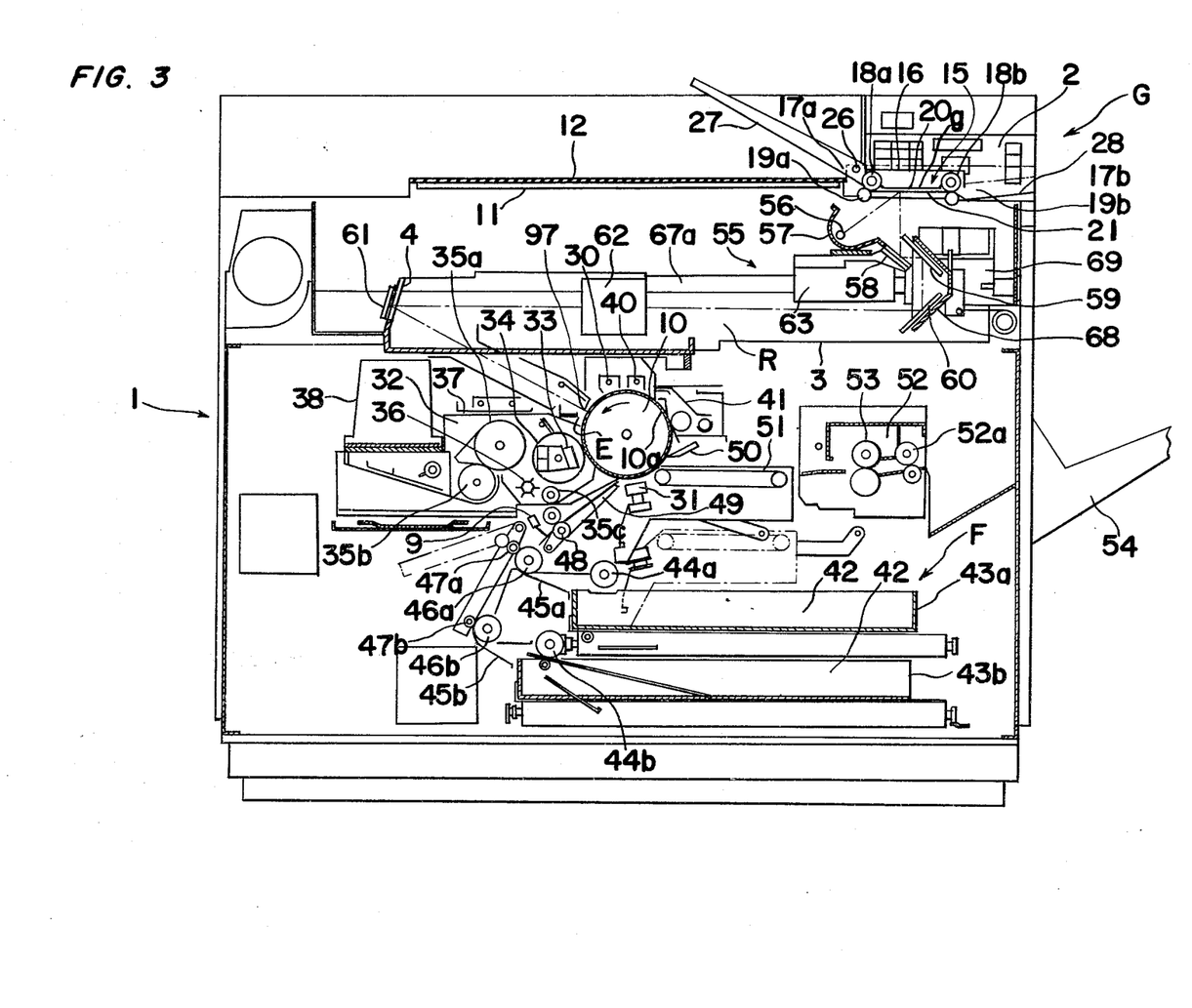
FIG. 3 is a schematic side sectional view, on an enlarged scale, of the electrophotographic copying apparatus of FIG. 2.

Referring now to the drawings, there is shown in FIGS. 2 and 3 an electrophotographic copying apparatus G according to one preferred embodiment of the present invention. The copying apparatus G generally includes an apparatus housing 1 of cubic box-like configuration defined by side walls, and a known photosensitive member or photoreceptor drum 10 of comparatively small diameter having a photoconductive photoreceptor surface 10a provided on the outer periphery thereof and rotatably disposed at approximately the central portion of the housing 1 for rotation counterclockwise so as to cause the photoreceptor surface 10a to sequentially pass various processing stations disposed therearound for image formation, such as a charging station with a corona charger 30, an exposure station E including an exposure slit 97, a developing station including, for example, a magnetic brush type developing device 32, a transfer station having a transfer device 31, a cleaning station with a blade cleaner 41, a charge erasing station equipped with a corona discharger 40, etc. The developing device 32 is provided with a rotary outer cylinder 34 incorporating therein a stationary magnet member 33, toner supplying rollers 35a and 35b, a developing material stirring roller 35c and stirring vane 36 which are all accommodated in a housing 37, and also a toner supplying tank 38. The copying apparatus G further includes a horizontal transparent platform 11, for example, of glass material for supporting a thick original (not shown), a control panel 2 and a sheet or thin original transporting means 15 which are disposed at the upper portion of the apparatus housing 1. A cover plate 12 is provided for pressing the original against the transparent platform 11, with one edge of the plate 12 being pivotally connected to the housing 1 to allow the plate 12 to be raised upward to an opened position. Within the apparatus housing 1 in a position below the transparent platform 11, there is provided an optical system 55 for image formation in a darkroom R separated from the photoreceptor drum 10 by a partition frame 3 which is disposed in a direction parallel to the transparent platform 11. In a copy paper feeding section F located at the right lower portion in the apparatus housing 1, trays or cassettes 43a and 43b containing therein transfer materials or copy paper sheets 42, for example, of A4 and B4 sizes respectively are detachably disposed so that the copy paper sheets 42 are selectively fed from the trays 43a and 43b by rotation of copy paper feeding rollers 44a and 44b and transferred to the transfer station at the photoreceptor drum 10 by guide plates 45a and 45b, transportation rollers 46a and 47a, and 46a and 47b.

The photoreceptor drum 10 to which has been preliminarily imparted a predetermined potential by the corona charger 30 is exposed during its counterclockwise rotation to the light images of the original to be copied by the optical system 55 in a manner described later for the formation of an electrostatic latent image on the photoreceptor surface 10a, and the electrostatic latent image thus formed is developed into a visible toner image by the developing device 32 and is further transferred by the transfer device 31 onto the copy paper sheet 42 fed to the transfer station. Subsequently, the copy paper sheet 42 having the visible toner image transferred onto it is separated from the photoreceptor drum 10 by a separating claw 50 disposed adjacent to the photoreceptor surface 10a, and further fed by a transportation roller and belt assembly 51 into a fixing device 52 whereat the visible toner image is fixed onto the copy paper sheet 42 by heat fusion as the sheet 42 is transported between a pair of fixing rollers 53. The copy paper sheet 42 bearing the visible fixed image thereon is discharged into a tray 54 provided on the right hand end wall of the apparatus housing 1 by a pair of transportation rollers 52a disposed following the fixing rollers 53 in the fixing device 52.

Figure 4:
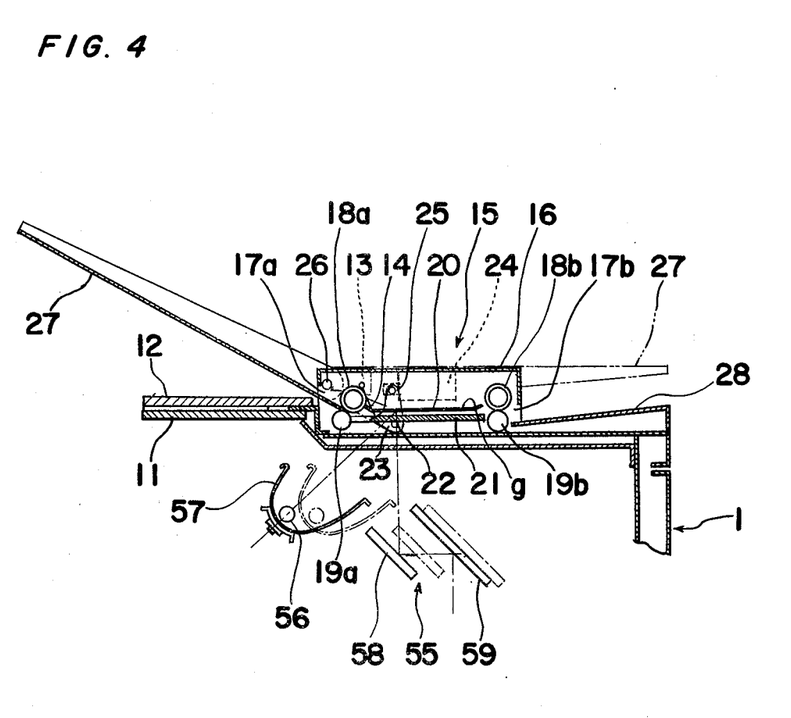
FIG. 4 is a fragmentary side sectional view, showing, on a still more enlarged scale, the construction of a sheet original transporting means incorporated in the copying apparatus of FIG. 2, FIGS. 5(a) and 5(b) are fragmentary perspective views of the sheet original transporting means of FIG. 4 with the guide plate thereof in the opened and the closed states respectively.
Figure 5A:
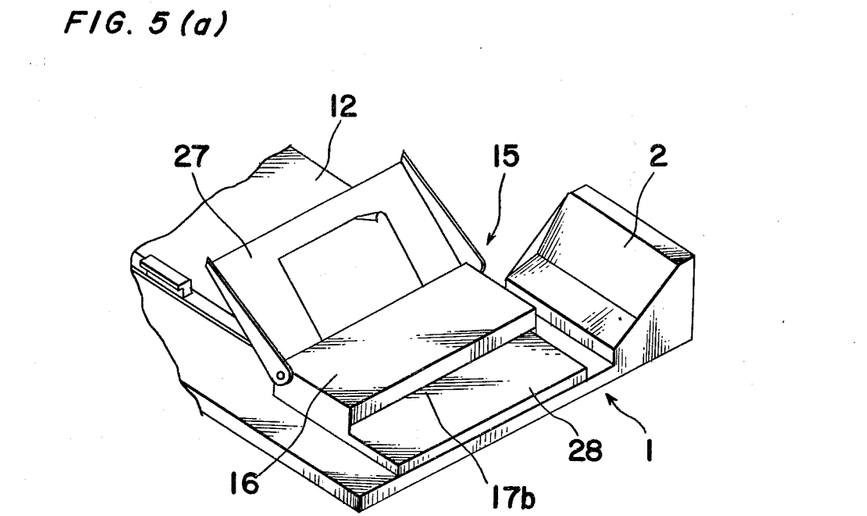
Figure 5B:
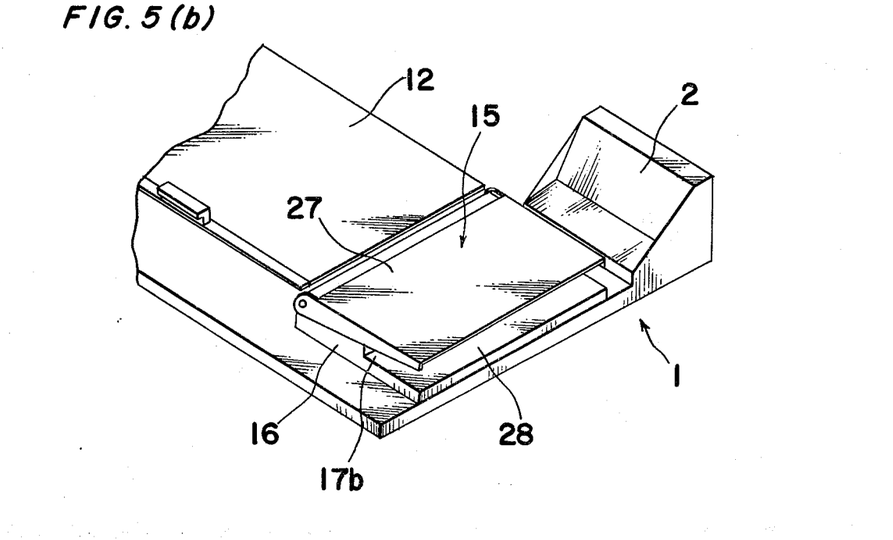

Referring also to FIGS. 4 to 5(b), the sheet original transporting means 15 disposed on the upper surface of the apparatus housing 1 in the position adjacent to the transparent platform 11 includes a cover member 16 having an insertion inlet 17a and discharge outlet 17b for the sheet original (not shown), a pair of spaced upper transportation rollers 18a and 18b and a corresponding pair of lower transportation rollers 19a and 19b rotatably mounted in said cover member 16, and a guide means g including a transparent plate 21, for example, of glass material and an original pressing plate 20 which are disposed in the space between the pairs of opposed rollers 18a and 19a, and 18b and 19b. The lower transportation rollers 19a and 19b are driven for rotation in synchronization with each other by a driving means (not shown) with the upper transportation rollers 18a and 18b rotating to follow the rotation of the lower rollers 19a and 19b. A guide plate 27 for the sheet original insertion is pivotally connected at one end thereof to the cover member 16 by a pin 26 at the end of the transporting means 15 having the insertion inlet 17a in the cover member 16, while at the end having the discharge outlet 17b in the cover member 16, a sheet original discharge tray 28 is disposed. The guide plate 27 is so mounted as to be turned counterclockwise to a predetermined angle during insertion of the sheet original for allowing the sheet original to be inserted into the inlet 17a and also for preventing the original pressing cover plate 12 for the transparent platform 11 from being raised upward toward the opened position (FIG. 5(a)). On the other hand, for copying thick originals, the guide plate 27 is rotated clockwise to a lowered position for covering the upper surface of the cover member 16 to enable the original pressing cover plate 12 for the thick original to be rotated upward to the opened position without obstruction by the guide plate 27 (FIG. 5(b)). In other words, the guide plate 27 serves as the guide means for the sheet original and also as a safety device for preventing the original pressing cover plate 12 from being opened upward when the sheet original transporting means 15 is in use.

Referring particularly to FIG. 4, the upper transportation roller 18a at the inlet side 17a of the cover member 16 is connected to a plunger 25 of a solenoid 24 through an approximately L shaped lever 23 pivotally mounted on a wall of the cover member 16 by a pin 22, while an actuator 14 for the microswitch 13 for energizing the solenoid 24 is disposed immediately behind the upper transportation roller 18a. Meanwhile, the upper transportation roller 18a is urged toward the lower transportation roller 19a by spring means (not shown), but since the solenoid 24 is normally kept energized to retract its plunger 25, the upper transportation roller 18a is moved upward by clockwise rotation of the lever 23 about the pin 22, and is spaced a certain distance from the lower transportation roller 19a.

Upon placing of the sheet original on the guide plate 27 and inserting it into the insertion inlet 17a, the leading edge of the sheet original contacts the actuator 14 to actuate the microswitch 13, and then engages a stop member (not shown) for being stopped thereat. The actuation of the microswitch 13 preliminarily energizes the original illuminating light source 56 for the optical system 55 described later, and simultaneously de-energizes the solenoid 24, while the upper transportation roller 18a is brought into contact with the lower transportation roller 19a under pressure by the spring means (not shown), with the stop described above also being released. At the same time, either one of the copy paper feeding rollers 44a or 44b is caused to rotate by the actuation of the microswitch 13 for transportation of the copy paper sheet 42 to transportation rollers 48. The copy paper sheet 42 thus transported contacts the actuator of a microswitch 9 disposed immediately before the transportation rollers 48 to turn ON the microswitch 9 and to be stopped while in contact with the rollers 48. Upon the turning ON of the microswitch 9, the lower transportation roller 19a is rotated to transport the sheet original for exposure, while the transportation rollers 48 are also rotated to transport the copy paper sheet 42 toward the transfer device 31. When the trailing edge of the sheet original leaves the actuator 14 of the microswitch 13 as the sheet original is transported, the solenoid 24 is energized to space the upper transportation roller 18a from the lower transportation roller 19a. During the transportation, the sheet original is illuminated by the light from an illuminating lamp 56 of the image forming optical system 55 described in detail hereinbelow.

Figure 6:
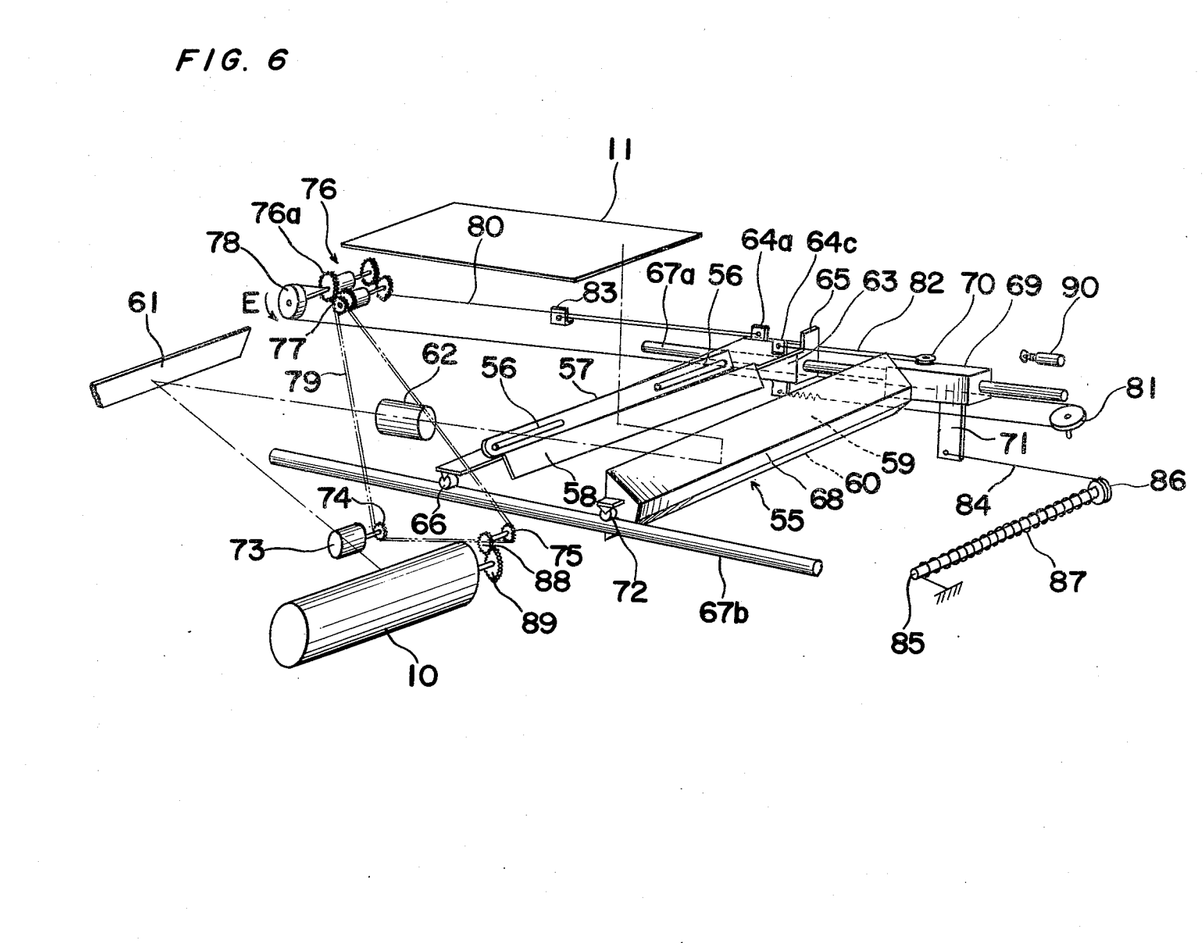
FIG. 6 is a perspective view showing, on an enlarged scale, the arrangement of the optical system and scanning means therefor incorporated in the copying apparatus of FIG. 2.

Referring particularly to FIGS. 3, 4 and 6, the optical system 55 for image formation generally includes the original illuminating light source or lamps 56 provided with a reflector 57, and a first reflecting mirror 58, a second reflecting mirror 59, a third reflecting mirror 60 and a fourth reflecting mirror 61 which are suitably inclined to direct the light images of the original toward the exposure station, and also an image forming lens assembly 62 disposed between the third reflecting mirror 60 and fourth reflecting mirror 61. The reflector 57 of the light source 56 and the first reflecting mirror 58 are fixed together into one unit, at opposite ends of which there are secured a sliding member 63 and a rotatable roller 66 respectively. The sliding member 63 is slidably supported on a guide shaft 67a secured to the frame of the apparatus housing 1 and extending in a direction parallel to the transparent platform 11, while the roller 66 is also supported for rotation on a guide shaft 67b also secured to the frame of the apparatus housing 1 extending in a direction parallel to the guide shaft 67a. The second reflecting mirror 59 and third reflecting mirror 60 are secured to a support plate 68 having a V shaped cross section so as to constitute one unit, and at opposite ends of the support plate 68, there are secured a sliding member 69 slidably mounted on the guide shaft 67a and a roller 72 rotatably supported on the guide shaft 67b. The fourth mirror 61 is fixed on a frame 4 (FIG. 3), with the image forming lens assembly being positioned in a light path between the third and fourth reflecting mirrors 60 and 61.

The optical system 55 as described above is driven horizontally for scanning under the transparent platform 11 in a direction parallel thereto by a main motor 73 (FIG. 6). More specifically, a timing belt 79 (FIG. 6) is passed around a gear 74 secured to a driving shaft of the main motor 73, a gear 75 for driving the photoreceptor drum 10 and a gear 77 constituting a transmission means 76 which has a clutch (not shown) and which meshes with a gear 76a secured to the same shaft as an optical system driving pulley 78, so that the rotational force of the main motor 73 is transmitted through the timing belt 79 and transmission means 76 to the optical system driving pulley 78. A first wire 80 is passed around the optical system driving pulley 78, with one end of the wire 80 being connected to a first projection 64a on an upper edge of the sliding member 63 for the illuminating light source 56 and first reflecting mirror 58, while the other end of the wire 80 is connected to a second projection 64b extending downwardly from the lower edge of the same sliding member 63 over a pulley 81 rotatably mounted on a pin secured to the frame of the apparatus housing 1. Additionally, a second wire 82 is fitted around a pulley 70 rotatably mounted on the sliding member 69 for the second and third reflecting mirrors, with one end of the wire 82 being connected to a third projection 64c on the sliding member 63 and with the other end of the same wire 82 being connected to a projection 83 secured to the frame of the apparatus housing 1. Moreover, there is provided a third wire 84 connected at its one end to a projection 71 extending downwardly from the sliding member 69, with the other end of the wire 84 being passed around and connected to a pulley 86 secured to an end of a shaft 85 rotatably journaled in the frame of the apparatus housing 1, while a return spring 87 is wound around the shaft 85 as shown. By this arrangement, the rotational force of the main motor 73 is transmitted from the gear 74 secured to the shaft of the motor 73 to the copy paper feeding rollers 44a and 44b, transportation rollers 46a and 46b, etc., (FIG. 3) and also to the photoreceptor drum 10 through the timing belt 79, driving gear 75, and a gear 88 secured to the same shaft as the gear 75 and in mesh with a gear 89 fixed to the shaft for the photoreceptor drum 10.

The image forming optical system 55 as described above normally has the sliding member 69 retracted toward the right in FIG. 6 by the force of the return spring 87 through the third wire 84, with consequent retraction of the sliding member 63 to the right through the second wire 82, and thus the sliding members 63 and 69, i.e., the illuminating light source 56 and the first reflecting mirror 58 integral with the sliding member 63, and the second and third reflecting mirrors 59 and 60 integral with the sliding member 69 are positioned at a scanning starting position where they contact a protrusion 65 extending upwardly from the sliding member 63 with a damper 90 fixedly provided within the apparatus housing 1.

Figure 7:
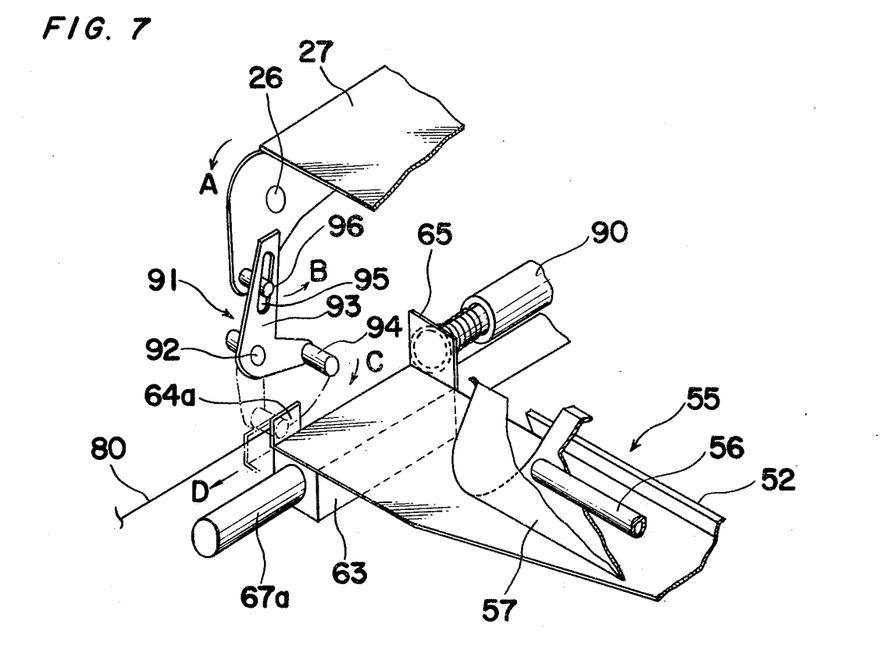
FIG. 7 is a perspective view showing, partly in section and on an enlarged scale, the construction of an optical system moving means employed in the copying apparatus of FIG. 2.

Referring also to FIG. 7, there is provided an optical system moving means 91 which includes an approximately L-shaped lever 93 pivotally connected to a pin 92 secured to a suitable frame (not shown) in the apparatus housing 1, an actuation pin 94 engageable with the projection 64a on the sliding member 63 and secured at one end of the arm 93, and an elongated opening 95 formed in the other end of the arm 93 for slidably receiving therein a pin 96 secured at one end, adjacent to the pin 26, of the sheet original insertion guide plate 27 described earlier. In the optical system moving means 91 as described above, when a thick original is to be copied, i.e., when the guide plate 27 is rotated clockwise to be lowered onto the cover member 16, the L-shaped arm 93 is rotated counterclockwise about the pin 92 by the sliding movement of the pin 96 within the elongated opening 95, and the optical system 55 is positioned at the scanning starting position, with the actuating pin 94 of the arm 93 out of contact with the projection 64a on the sliding member 63. Meanwhile, for copying a sheet original, the guide plate 27 is rotated counterclockwise in the direction of the arrow A in FIG. 7, with consequent sliding movement of the pin 96 within the elongated opening 95 in the arm 93 in the direction shown by the arrow B, and thus the L-shaped arm 93 is rotated clockwise about the pin 92 as shown by the arrow C. Following the above rotation of the arm 93, the actuating pin 94 of the arm 93 engages the projection 64a on the sliding member 63 to move the sliding member 63 to a certain extent in the direction of the arrow D. In other words, by the above movement, the illuminating light source 56, and the first, second and third mirrors 58, 59 and 60 are shifted from the scanning starting position shown in chain lines in FIG. 4 to an optical system stationary position for copying the sheet original shown in full lines in FIG. 4.

Subsequently, scanning of the image forming optical system 55 is as described hereinbelow.

The optical system 55 is driven to carry out scanning when a thick original is to be copied, in which case, the guide plate 27 is rotated so as to be lowered onto the cover member 16, and a print switch (not particularly shown) provided on the control panel 2 (FIG. 3) is turned ON, the thick original being suitably placed on the transparent platform 11 after rotating the original pressing cover plate 12 to the opened position. The turning ON of the print switch causes the feeding roller 44a or 44b, and the transportation roller 46a or 46b to start rotation for selectively transporting the copy paper sheet from the trays 43a and 43b to the transportation roller 48, whereat the microswitch 9 is turned ON by the copy paper sheet thus transported for causing the optical system driving pulley 78 to be rotated through the transmission system 76 simultaneously with rotation of the photoreceptor drum 10. The optical system driving pulley 78 thus rotated in the direction of the arrow E in FIG. 6 causes the illuminating light source 56 and first mirror 58 to be scanned leftward in FIG. 6 at a speed equal to the peripheral speed of the photoreceptor drum 10 by movement of the first wire 80 as the pulley 78 rotates. Following the above scanning, the second and third reflecting mirrors 59 and 60 are also scanned toward the left in FIG. 6 as a single unit by the second wire 82 at a speed half the scanning speed of the illuminating light source 56 and first mirror 58. As the above scanning proceeds, the thick original (not shown) placed on the transparent platform 11 is sequentially subjected to the projection of light from the illuminating lamp 56 in the direction of scanning, while the image-carrying light reflected therefrom is in turn reflected by the first, second and third reflecting mirrors 58, 59 and 60, and directed through the image forming lens assembly 62 to the fourth reflecting mirror 61 to be further reflected thereat for being sequentially directed through the slit 97 onto the photoreceptor surface 10a of the photoreceptor drum 10 to carry out exposure thereof. Upon completion of the exposure, the illuminating light source 56 is de-energized, with simultaneous disengagement of the clutch (not shown) of the transmission means 76, and the optical system is returned in the rightward direction in FIG. 6 by the returning force of the return spring 87. It should be noted here that there is provided a slight looseness between the sliding members 63 and 69 and the guide shaft 67a for reducing frictional resistance therebetween so as to increase the speed of the returning movement.

On the other hand, for copying a sheet original, when the guide plate 27 is first rotated counterclockwise to the predetermined angle for insertion of the sheet original, the illuminating light source 56 and the first, second and third mirrors 58, 59 and 60 for the optical system 55 are moved to the positions shown by the solid lines in FIG. 4 by the optical system moving means 91 since the clutch of the transmission means 76 is disengaged through a switch (not shown), and the optical system 55 illuminates the sheet original transported in the earlier described manner by the sheet original transporting means 15 for sequentially exposing the photoreceptor surface 10a of the photoreceptor drum 10.

Figure 8:
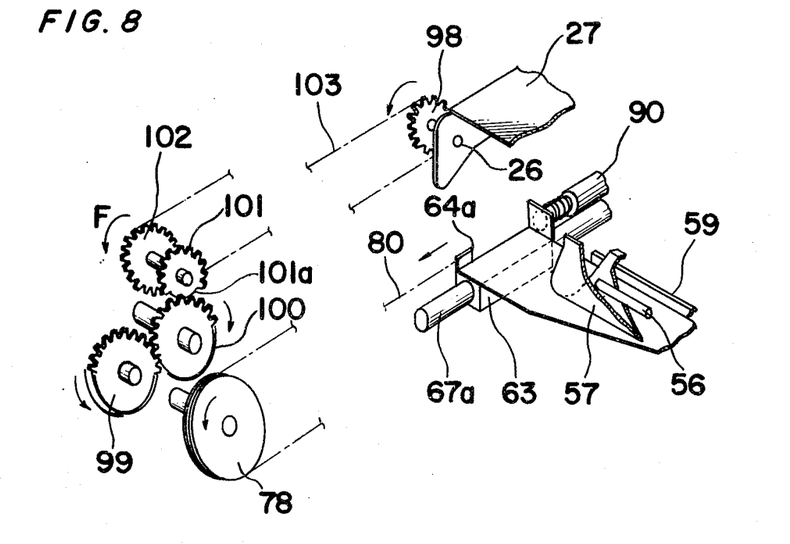
FIG. 8 is a view similar to FIG. 7, but particularly showing a modification thereof.

Referring now to FIG. 8, there is shown a modification of the optical system moving means 91 of FIG. 7. In this modification, the L-shaped lever 93 pivotable about the pin 92 and having the actuation pin 94 at its one end and the elongated opening 95 at the other end thereof for engagement with the pin 96 described as employed in the moving means 91 (FIG. 7) is dispensed with, and the modified optical system moving means is provided with a sprocket 98 fixedly mounted on the pin 26 on the guide plate 27, a gear 99 secured to the same shaft as the driving pulley 78, a rotatable gear 101 engaging the gear 99 through another rotatable gear 100, a sprocket 102 secured to the same shaft as the gear 101, and a chain passed around the sprockets 98 and 102. The sprocket 98 is rotated through a predetermined angle as the guide plate 27 is turned counterclockwise, and the rotation of the sprocket 98 is transmitted to the pulley 78 through the chain 103, sprocket 102, and gears 101, 100 and 99. Accordingly, the pulley 78 is subjected to rotation through a predetermined angle, corresponding to the rotation of the guide plate 27. In other words, when the guide plate 27 is turned counterclockwise to the opened position for copying the sheet original, the pulley 78 is rotated in the direction of the arrow F to bring the optical system to the position shown by the solid lines in FIG. 4. It is to be noted that the gear 101 is provided with a notched portion 101a (FIG. 8) without teeth on a part of its periphery so that when the guide plate 27 is located on the cover member 16, the notched portion 101a confronts the gear 100 so as not to be affected by the rotation of the pulley 78 during normal scanning, but when the guide plate 27 is rotated counterclockwise from the cover member 16, the gear 101 is rotated so that its teeth engage the teeth of the gear 100 for rotating the pulley 78.

It should be noted that in the foregoing embodiments, although the optical system 55 is described as mainly moved by the rotation of the guide plate 27, the arrangement may be modified so that the movement of the optical system is controlled through electrical signals, for example, by a change-over switch (not shown) provided on the control panel 2 for associating the shifting of the optical system with a suitable copying change-over operation.

As is clear from the foregoing description, according to the present invention, there is provided the optical system moving means which moves the image forming optical system from the scanning starting position for copying thick originals to a stationary position for copying thin sheet originals in association with the change-over operation between thick original copying and sheet original copying. Accordingly, the distance between the first and second reflecting mirrors when the optical system is located at the stationary position is increased as compared with the distance therebetween when the optical system is positioned at the scanning starting position, and thus the disadvantages inherent in exposures in the conventional arrangements are eliminated and the machine provides clear and accurate copied images. Furthermore, in the arrangement of the present invention, since the distance between the first and second reflecting mirrors is short in the scanning starting position, the size of the copying apparatus itself can be made compact, while even if the first reflecting mirror is inclined, when the sliding member of the optical system contacts the damper at the scanning starting position, due to the presence of the looseness provided between the sliding member and the guide shaft for reduction of the frictional resistance therebetween, the inclination of the first reflecting mirror by the damper is rectified, since the optical system is moved to the stationary position for sheet original copying by the optical system moving means. Moreover, provision of the sheet original transporting means separately from the transparent platform for supporting the thick original facilitates manipulation of the copying apparatus, and also makes it possible to provide two pairs of sheet original transportation rollers above and below the path of the sheet original respectively, so that even a sheet original having less stiffness can be positively transported without wrinkling or jamming during transportation.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as being included therein.

What is claimed is:
1. An electrophotographic copying apparatus which comprises:
   a transparent platform disposed at an upper portion of the apparatus for supporting thereon thick originals to be copied;
   means for transporting sheet originals positioned adjacent said transparent platform and having sheet original transportation rollers;
   an optical system for image formation having at least an illuminating light source for illuminating the original, first and second reflecting mirror means for projecting the image of the original onto a moving photosensitive member, moving means connected to said light source and said mirror means for (1) moving said light source and said first mirror means and said second mirror means beneath said transparent platform at a first speed or a second speed, said speeds being in a speed ratio of 2 to 1 to scan said transparent platform for copying a thick original and (2) for moving said light source and said first and second mirror means to a scanning starting position with said mirror means closest to each other beneath said sheet original transporting means and discontinuing movement thereof when said apparatus is to copy a sheet original;

changeover means associated with said apparatus for changing over the operation thereof from copying thick originals to copying sheet originals; and shifting means connected to said changeover means and to said moving means (1) for moving said light source and said mirrors from said scanning starting position under said means for transporting sheet originals and (2) for shifting said first mirror means away from said second mirror means so as to make the distance between said first and second mirror means in the stationary position greater than the distance therebetween in the scanning starting position upon the operation of said changeover means.

2. An electrophotographic copying apparatus as claimed in claim 1 wherein said changeover means includes a guide plate member pivotally mounted between said transparent platform and said sheet original transporting means and pivotable between a position over said sheet original transporting means in which position the thick original can be placed on said transparent platform, to a position in which said guide plate member is toward said transparent platform and is positioned for guiding sheet originals into said sheet original transporting means, said guide plate member being connected to said shifting means for actuating said shifting means for moving said optical system from the scanning starting position to the stationary position when said guide plate member is pivoted from over said sheet original transporting means toward said transparent platform.

3. An electrophotographic copying apparatus which comprises:

a transparent platform disposed at an upper portion of the apparatus for supporting thereon thick originals to be copied;

means for transporting sheet originals positioned adjacent said transparent platform and having sheet original transportation rollers;

an optical system for image formation having at least an illuminating light source for illuminating the original, first and second reflecting mirror means for projecting the image of the original onto a moving photosensitive member, moving means connected to said light source and said mirror means (1) for moving said light source and said mirror means and said second mirror means beneath said transparent platform at at a first speed or a second speed, said speeds being in a speed ratio of 2 to 1 to scan said transparent platform for copying a thick original and (2) for moving said light source and said first and second mirror means to a scanning starting position with said mirror means closest to each other beneath said sheet original transporting means and discontinuing movement thereof when said apparatus is to copy a sheet original; and shifting means connected to said moving means (1) for moving said light source and said mirrors from said scanning starting position toward said transparent platform to a stationary position under said means for transporting sheet originals and (2) for shifting said first mirror means away from said secone mirror means so as to make the distance beween said first and second mirror means in the stationary position greater than the distance therebetween in the scanning starting position.

* * * * *